United States Patent [19]
Campbell et al.

[11] Patent Number: 5,987,998
[45] Date of Patent: Nov. 23, 1999

[54] HIGH TEMPERATURE DRIVE SYSTEM FOR A CORIOLIS MASS FLOWMETER

[75] Inventors: David Lee Campbell; John Richard McCarthy, both of Boulder; Kurtis Leroy McCormick, Lafayette; Daniel Patrick McNulty, Westminster, all of Colo.

[73] Assignee: Micro Motion, Inc., Boulder, Colo.

[21] Appl. No.: 09/140,098

[22] Filed: Aug. 26, 1998

[51] Int. Cl.[6] ....................................................... G01F 1/78
[52] U.S. Cl. ............................... 73/861.356; 73/861.355; 73/861.357
[58] Field of Search ........................ 73/861.355, 861.356, 73/861.357

[56] References Cited

U.S. PATENT DOCUMENTS

| | | | |
|---|---|---|---|
| 4,876,898 | 10/1989 | Cage et al. ............................. | 73/861.38 |
| 5,038,620 | 8/1991 | Rogers, Jr. et al. ................ | 73/861.355 |
| 5,301,557 | 4/1994 | Cage et al. ......................... | 73/861.355 |
| 5,379,649 | 1/1995 | Kalotay ............................... | 73/861.357 |
| 5,497,666 | 3/1996 | Patten et al. ........................ | 73/861.355 |

*Primary Examiner*—Benjamin R. Fuller
*Assistant Examiner*—Jewel V. Thompson
*Attorney, Agent, or Firm*—Duft, Graziano & Forest, P.C.

[57] ABSTRACT

A drive system for use in a temperature environment. The drive system is made of materials that can withstand high temperatures without degrading. There are no plastics or epoxy adhesives used in this drive system. The drive system is also made more efficient by placing the drive system on a flow tube outside of a loop in the flow tube between the inlet and the outlet.

18 Claims, 3 Drawing Sheets

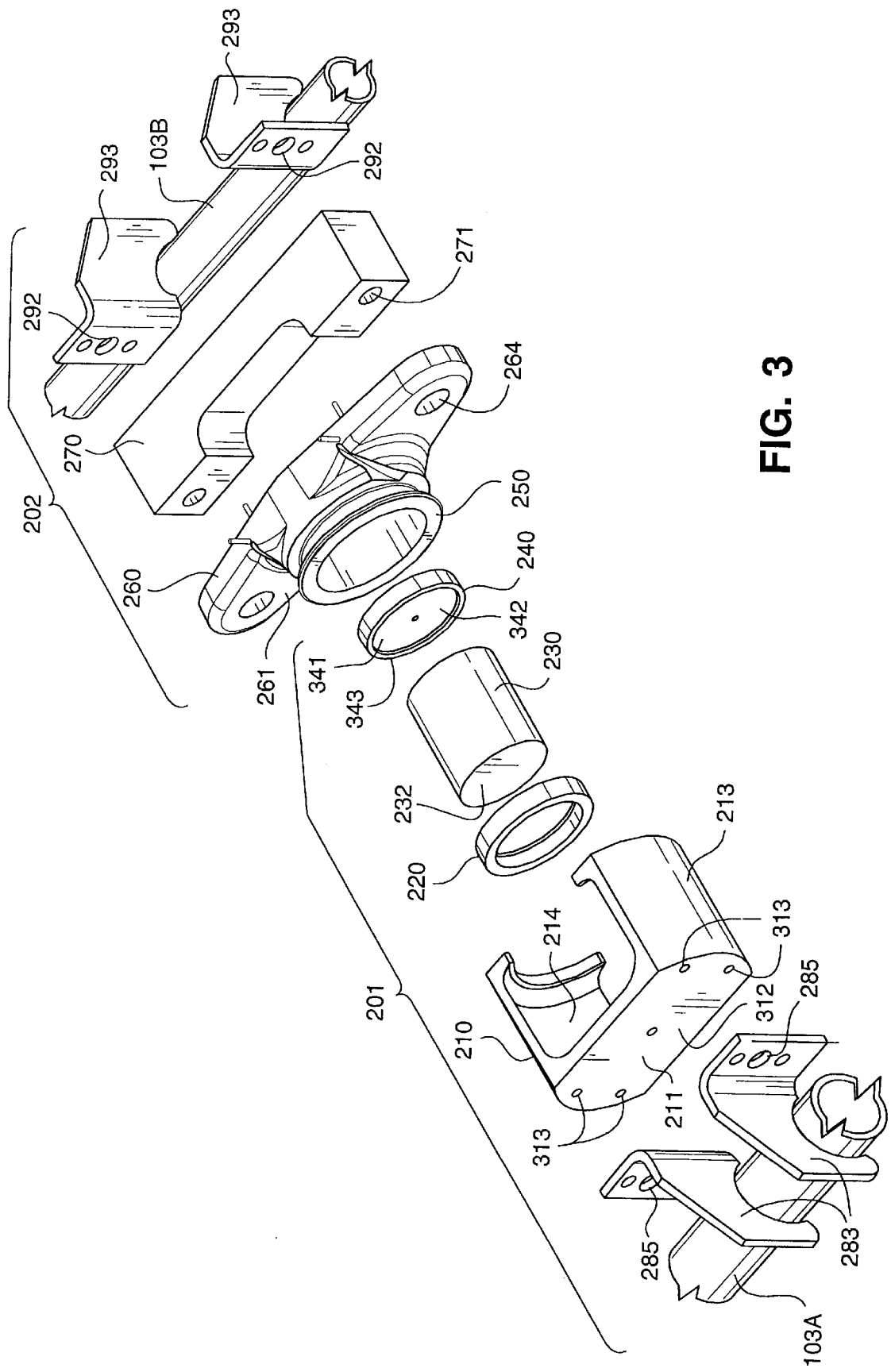

HIGH TEMPERATURE DRIVE SYSTEM FOR A CORIOLIS MASS FLOWMETER

FIELD OF THE INVENTION

This invention relates to a drive system designed to operate in a high temperature environment where the temperature may reach 650 degrees Fahrenheit. More particularly, this invention relates to a drive system for a Coriolis flowmeter that operates in a high temperature environment. The present invention also relates to placing the drive system of a Coriolis flowmeter on the top, outer side of flowtubes loops to maximize the efficiency of the drive system.

Problem

It is known to use Coriolis effect mass flowmeters to measure mass flow rate and other information of materials flowing through a pipeline as disclosed in U.S. Pat. No. 4,491,025 issued to J. E. Smith, et al. of Jan. 1, 1985 and U.S. Pat. No. Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a force that causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at two different points on the flow tube to produce sinusoidal signals representative of the motion of the flow tube at the two points.

A phase difference of the two signals received from the sensors is calculated in units of time. The phase difference between the two sensor signals is proportional to the mass flow rate of the material flowing through the flow tube or flow tubes. The mass flow rate of the material is determined by multiplying the phase difference by a flow calibration factor. This flow calibration factor is determined by material properties and cross sectional properties of the flow tube.

One type of driver commonly used in a Coriolis flowmeter is an electromagnetic driver. A common electromagnetic driver has a magnet having a first surface opposed to a coil. The magnet is affixed to a first flow tube and the coil is affixed to a second flow tube. The magnet and coil are counterbalanced to facilitate oscillation. In a preferred embodiment, the magnet has a magnet pole attached to the magnet end opposing the coil to extend the magnet. An alternating electrical current is applied to the coil which causes the coil and magnet pole to alternately attracted to and repelled from one another. This causes the flow tubes to oscillate. A magnet keeper encloses the magnet to direct the magnetic flux into the coil windings. Plastic sleeves are typically used to align the magnet, magnet pole, magnet keeper and coil. The magnet poles, magnet and magnet keeper are typically affixed to one another with an epoxy adhesive or other type glue.

It is a problem to incorporate a conventional electromagnetic driver into a Coriolis flowmeter that operates in a high temperature environment where the temperature may reach 650 degrees Fahrenheit. At these high temperatures, the plastics and adhesives used to align and affix components of the driver will degrade which causes mechanical failures in the driver. There is a need for a driver that does not contain materials that degrade in a high temperature environment.

A second problem in Coriolis flowmeter drive systems is the need for efficiency in the driver. Driver efficiency is especially a problem in mid-size flowmeter typically used to measure flow through a 3 inch pipeline. In smaller flowmeters, efficiency is not a problem because the amount of power applied to the driver by a transmitter is enough to provide sufficient force to oscillate the flow tubes. In a larger flowmeter, efficiency is typically not a problem for a driver because an amplifier is typically added to the drive circuitry to increase the amount of power applied to the coil. This assures that the driver can apply a sufficient force to oscillate the larger flow tubes. The amplifiers added to the drivers of large flowmeters are expensive and add greatly to the design and production cost of a flowmeter.

There is typically enough power applied to the driver by the transmitter to drive the flow tubes in a mid-sized flowmeter. However, the driver has to be extremely efficient because there is not a great margin between the amount of power available and the power needed to drive the flow tubes. There is a need for more efficient flow tube drivers especially in these mid-size flowmeters.

Solution

The above and other problems are solved and an advance in the art is made by the provision of a high temperature driver. The high temperature driver is constructed of material that will not degrade at high temperatures. All of the components of the high temperature driver are made of material having matching coefficients of thermal expansion to allow the material to expand and contract at the same rate to prevent damage to the driver due to the high temperature.

The high temperature driver has a coil assembly attached to a first flow tube and a magnet assembly affixed to a second flow tube. The magnet assembly of the driver is configured in the following manner to avoid the use of plastics and glue to affix or align the components. A first surface on a first end of a magnet is juxtaposed to a first end of a coil. A magnet pole is a metal member affixed to the first surface of the magnet between the magnet and the coil with a first surface facing the coil. The magnet pole is alternately attracted to and repelled from the coil as an alternating current is applied to the coil. The magnet pole is affixed to the first surface of the magnet by a recess formed in a second surface of the pole which receives a first end of the magnet and caps over the first surface of the magnet. Magnetic attraction holds the magnet pole in place on the magnet. A second end of the magnet is pressed into a magnet sleeve. The magnet sleeve is then brazed or welded to a surface of a magnet keeper. The magnet keeper is a platform which is the base for a magnet assembly. Walls on opposing sides of the magnet keeper substantially enclose the magnet to direct the magnetic flux of the magnet into the windings of the coil. The limiting of the magnetic field maintains the alignment between the magnet and the coil. Mounting brackets are affixed to a second surface of the magnet keeper and are brazed to the second flow tube affixing the magnet assembly to the flow tubes.

A coil assembly is configured in the following manner to eliminate the use of plastics and glues in the driver. The coil is affixed to a coil bobbin which is affixed to a first surface of a coil spacer. The coil spacer is of a sufficient mass to act as a counter balance to the magnet assembly. Mounting brackets are affixed to a second surface of the coil spacer to affix the coil assembly to the first flow tube.

The high temperature driver is also made more efficient in a Coriolis flowmeter by affixing the driver to flow tubes on outside the flowtubes at the top of loops of the tubes. The position on the outside of the loops is where the amplitude of the tube oscillations are the greatest which generates a greater amount of back electromotive force (EMF) in the driver. The position of the driver also increases the distance between the driver and brace bars on the flow tubes which gives the driver a greater mechanical advantage or leverage for oscillating the flow tubes.

DESCRIPTION OF THE DRAWINGS

The above and other advantages of the high temperature drivers can be understood from reading the below detailed description and the following drawings:

FIG. 3 illustrating the high temperature drive system from a second side.

DETAILED DESCRIPTION

Figure 1:
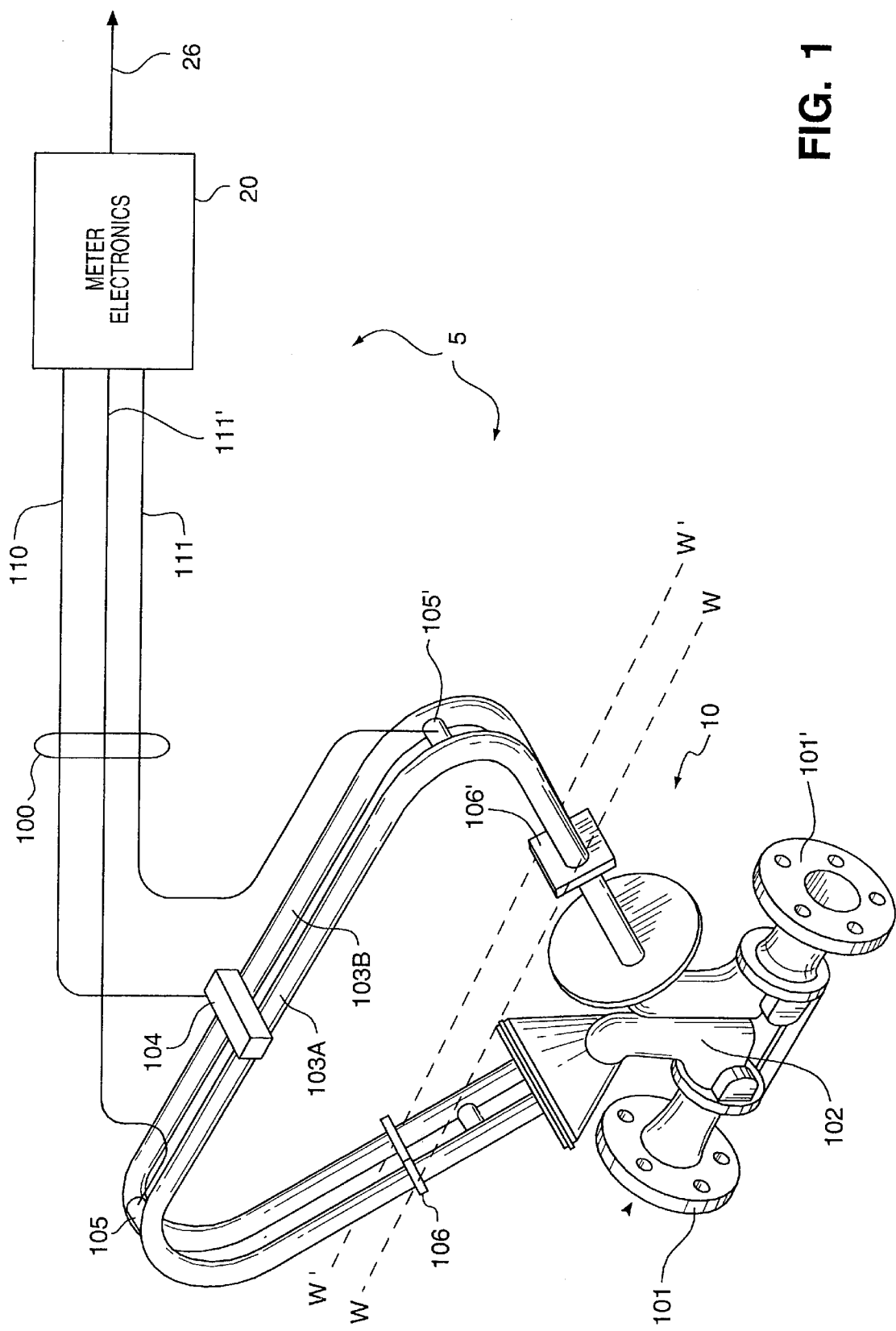
FIG. 1 illustrating a Coriolis flowmeter.

Coriolis Flowmeter in General—FIG. 1

FIG. 1 illustrates a Coriolis flowmeter 5 comprising a flowmeter assembly 10 and meter electronics 20. Meter electronics 20 is connected to meter assembly 10 via leads 100 to provide density, mass flow rate, volume flow rate, totalized mass flow and other information over path 26. It should be apparent to those skilled in the art that the present invention can be used by any type of Coriolis flowmeter regardless of the number of drivers or the number of pick-off sensors.

Flowmeter assembly 10 includes a pair of flanges 101 and 101', manifold 102 and flow tubes 103A and 103B. Connected to flow tubes 103 A and 103 B are driver 104 and pick-off sensors 105 and 105'. Brace bars 106 and 106' serve to define the axes W and W' about which each flow tube 103A and 103B oscillates.

When flowmeter assembly 10 is inserted into a pipeline system (not shown) which carries the material being measured, material enters flowmeter assembly 10 through flange 101, passes through manifold 102 where the material is directed to enter flow tubes 103A and 103B, flows through flow tubes 103 A and 103B and back into manifold 102 where it exits meter assembly 10 through flange 101'.

Flow tubes 103A and 103B are selected and appropriately mounted to manifold 102 so as to have substantially the same mass distribution, moments of inertia, and elastic modules about bending axes W—W and W'—W' respectively. The flow tubes extend outwardly from the manifold in an essentially parallel fashion.

Flow tubes 103A–B are driven by high temperature driver 104 in opposite directions about their respective bending axes W and W' and at what is termed the first out of bending fold of the flowmeter. High Temperature driver 104 is a drive system comprising a magnet mounted to flow tube 103A and an opposing coil mounted to flow tube 103B. An drive signal which is an alternating current is applied by meter electronics 20, via lead 110 to driver 104 and cause drive 104 to oscillate flowtubes 103A–B.

In order to maximize the efficiency of high temperature driver 104, driver 104 is mounted to the outside of the loops formed by flow tubes 103A and 103B. High temperature driver 104 is positioned on the outside of loops because that is where the amplitude of the flow tube oscillations are greatest. As the amplitude of the oscillations increases, the back EMF generated between the coil and magnet increases. The increase in back EMF increases the efficiency of driver 104.

The increase in back EMF is do to the greater amplitude of the movement between the coil and magnet in driver 104. The following equation determines the amount of back EMF produced by driver 104.

$$EMF_{back}=(B*V)*L \quad (1)$$

where:

B=magnetic flux density;

V=velocity of the coil with respect to the magnet; and

L=coil wire length.

From the above, equation V can be determined by the following equation:

$$V=2*A*\omega \quad (2)$$

where:

the equation is multiplied by 2 since both the magnet and coil oscillate;

A=amplitude of the displacement between the coil and magnet; and

ω=angular velocity of the coil with respect to the magnet.

It is known that $$\omega=2*\Pi*F \quad (3)$$

where

F=tube frequency.

Substituting equations (2) and (3) into equation (1) produces the following equation:

$$EMF_{back}=B*4*A*\Pi*F*L \quad (4)$$

It can be assumed that B and L remain constant in a given driver. Therefore, only A or F can be increased to increase the back EMF. In order to increase the amplitude (amplitude), the magnet and the coil must be placed in the position on the flow tubes that move the farthest distance apart which is the top of the flow tubes.

A second advantage of mounting driver 104 outside of the flow tube loops is that the distance between the brace bars 106–106' and driver 104 is increased. The increase in distance creates a greater mechanical advantage or leverage about axes w–w' for driver 104 to oscillate flow tubes 103A–B. The greater mechanical advantage also increases the efficiency of driver 104. The following is a proof that the position of driver 104 on top of the flow tubes increases the efficiency of driver 104.

It is known that F, the force required to move a cantilever such as a flow tube is expressed in the following equation:

$$F=(-3*y*E*I)/L^3 \quad (5)$$

where:

y=the deflection of the flow tube;

E=the modulus of elasticity;

I=moment of inertia; and

L=the length of the cantilever which is the distance of the of the driver from the brace bars or the flow meter of flowmeter.

As length increases, the force required to oscillate the flow tubes decreases. This assumes that all y remains constant. As the force required to oscillate the flow meters increases, the power required to oscillate the flow tubes decreases. The decrease in required power is proved by the following equations:

$$\text{work}=2\{(F^*A)-(F^*-A)\} \quad (6)$$

where

A=distance the tubes are oscillated.

$$\text{Power}=\text{work}/\text{time} \quad (7)$$

Substituting equation (6) into equation (7) produces the following equation:

$$\text{Power}=2^*\{(F^*A)-(F^*-A)\}/\text{time} \quad (8)$$

Re arranging equation (8) produces:

$$\text{Power}^*\text{time}=2^*(F^*A)^2 \quad (9)$$

From equation (9), it can be seen that as F decreases the power needed to oscillate the flow tubes per unit time decreases. From equation (6), it can be seen that force decreases as the length of the mechanical cantilever increases. Therefore, placing driver 104 on the top side of the loop reduces the power needed to drive the flow tubes by increases the length of the cantilever.

Meter electronics 20 receives the right and left velocity signals appearing on leads 111 and 111', respectively. Meter electronics 20 produces the drive signal on lead 110 which causes driver 104 to oscillate flow tubes 103A and 103B. Meter electronics 20 process left and right velocity signals to compute mass flow rate and other properties of the material flowing through the flow tube. Path 26 provides an input and an output means that allows meter electronics 20 to interface with an operator.

Figure 2:
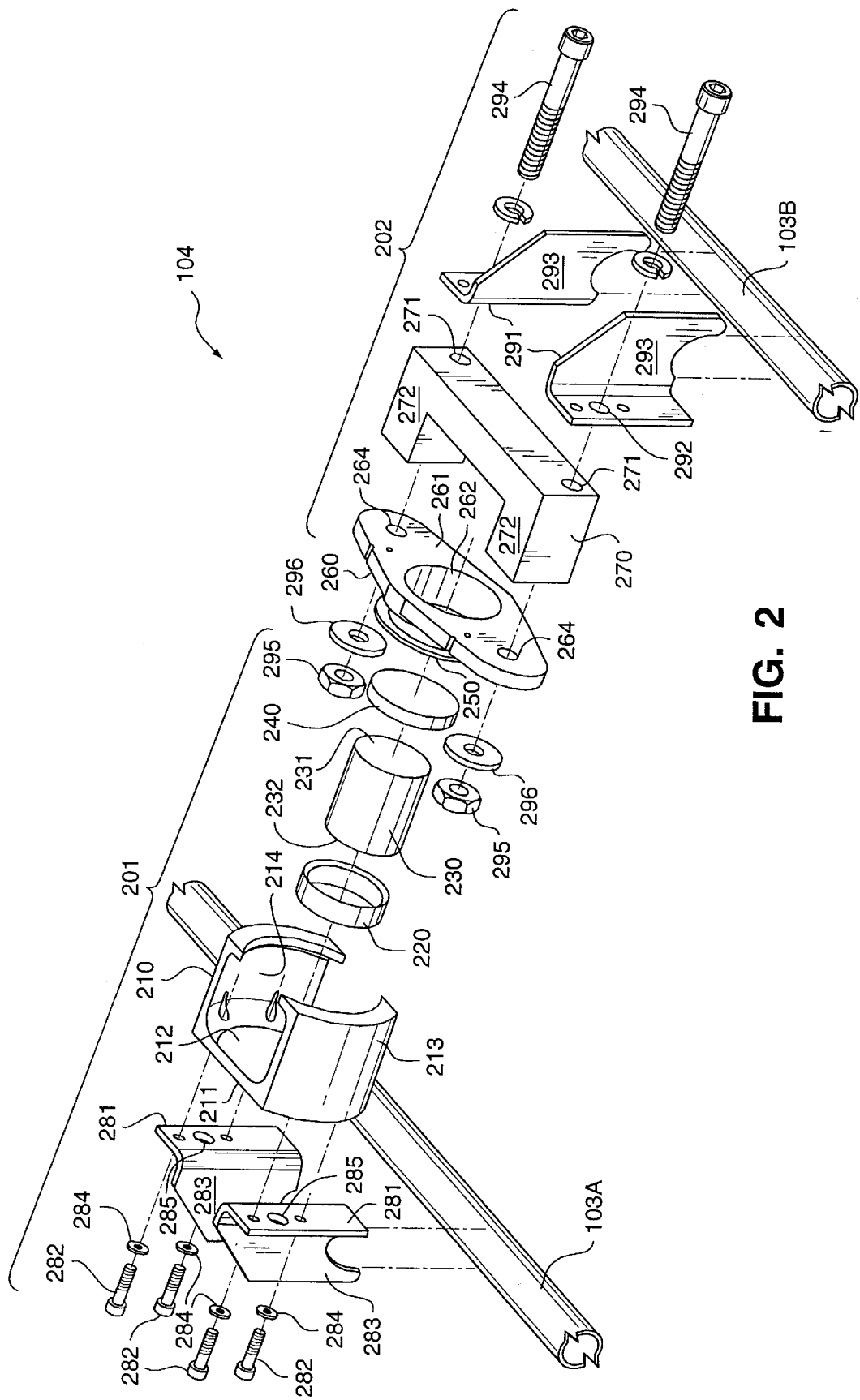
FIG. 2 illustrating a high temperature drive system from a first side.

High Temperature Driver System 104—FIGS. 2 and 3

High Temperature Driver 104 is illustrated in FIGS. 2 and 3. For purposes of discussing the relationship between the components of high temperature driver 104, FIGS. 2 and 3 will be referred to intermittently in the below discussion. High temperature driver 104 does not have any plastic components that would degrade in a high temperature environment where the temperature is significantly higher than ambient temperature and may reach 650 degrees Fahrenheit. Epoxy adhesives and other adhesives that are typically used to affix components to one another in prior art drivers are not used in high temperature driver 104 because the adhesives tend to degrade in high temperature environment. The inventive aspect of this invention is the use a device that resistant to high temperature to attach magnet 230 to a magnet keeper. In the preferred exemplary embodiment described in FIGS. 2 and 3 the device attaching the magnet to the magnet keeper 210 is magnet sleeve 230. However, it is envisioned that other method including but not limited to a locking device, a screw and treaded opening, or a recessed cavity with the magnet pressed fit into the cavity could be used to attach magnet 230 to magnet keeper 210.

The components of high temperature driver 104 are made of materials have substantially equal coefficients of thermal expansion (CTE). The substantially equal CTEs allow the materials to expand and contract at equal rates due to temperature changes without damaging high temperature driver 104. High temperature driver has magnet assembly 201 and coil assembly 202. Magnet 230 and coil 250 are opposed to one another to provide the oscillation of driver 104.

The base of magnet assembly 201 is magnet keeper 210. Magnet keeper 210 has a substantially elliptical platform 211 with a first surface 212 and a second surface 312. Walls 213 and 214 extend outward from the substantially circular ends of first surface 212. Each wall 213 and 214 has a ledge extending inward from the end 217 of the walls. Walls 213 and 214 control the size and direction of the magnetic field of magnet 230 to keep magnet 230 and coil 250 aligned.

Mounting brackets 281 are affixed to a second end 311 of magnet keeper 210. Mounting brackets 281 have a base and wings 283 that extend perpendicularly from the base. The wing have a bottom edge that is curved to mate with a flow tube. The curved edges of wings 283 are a brazed or welded to the flow tube to affix magnetic assembly 201 to the flow tubes. Screws 282 are threaded through washers 284, openings 285 of mounting brackets 281, and openings 313 of magnet keeper 210 to affix mounting brackets 281 to magnet keeper 210.

Magnet 230 is a substantially cylindrical magnet that has a first end 231 and a second end 232. Magnet 230 is press fit into magnet sleeve 220. Magnet sleeve 220 is made of metallic material that can be brazed or welded to first surface 212 of magnet keeper to secure magnet 230 to magnet assembly 201. In the preferred exemplary embodiment, Magnet sleeve 220 is a ring of steel carbon that has an opening 221 that is sized to have a radius that is slightly less than the radius of magnet 230.

Magnet pole 240 is made of a magnet material and is affixed to first end 231 of magnet 230. Magnet pole 240 is attracted and repelled by the coil 250 to cause the oscillation of high temperature driver 104. Magnet pole 240 has a cavity 341 defined by a wall 343 extending outward from the edge of surface 342. Cavity 341 receives first end 231 of magnet 230 to form a cap over magnet 230. Magnetic attraction between magnet pole 240 and magnet 230 holds magnet pole 240 in place.

Coil 250 acts as an electromagnet. As an alternating current is applied to coil 250 the polarity of coil 250 changes. The change in polarity in coil 250 causes magnetic pole 240 to be alternately attracted and repelled from coil 250. When magnet pole 240 is repelled from coil 250, magnet assembly 201 is pushed away from coil assembly 202. When magnet pole 240 is attracted to coil 250, magnet assembly 201 is pulled toward coil assembly 202.

Coil 250 is wound around coil bobbin 260. Coil bobbin 260 is an insulated spool that acts as a support for coil 250. In the preferred embodiment, coil bobbin 260 is a platform 261 having an opening 262. Electrical lines (not shown) supply electrical current to coil 250. Bolts 294 are inserted through openings 271 of coil spacer 270 and openings 262 of coil bobbin 260 to affix coil bobbin 260 to coil spacer 270.

Coil spacer 270 is the base of coil assembly 202. Magnet assembly 201 and coil assembly 202 must be the same mass to cause the oscillation of the driver 104 as the current applied to coil 150 alternates. Coil spacer 270 is of a sufficient mass to act as a counter weight to magnet assembly 201. A counter weight must be added to coil assembly 202 because magnet 230 and the other components of magnet assembly 201 have a greater mass than coil assembly 202. Spacers 272 extend outward from first end 372 of coil spacer 270. The spacers 272 are affixed to coil bobbin 270 and add width to coil assembly 202. The additional width is needed to place coil 250 in a position proximate magnet pole 240. Mounting brackets 291 are affixed to a second end 272 of coil spacer 270.

Mounting brackets 291 have a base and a wing 293 that extends substantially perpendicularly from the base. Wings 293 are form with a curved bottom edge which is mated to the curvature of the flow tube. The curved bottom edge is brazed or welded to the flow tube. Coil assembly 202 is held together by bolts 294 which extend through openings 292, 271, and 262. Nuts 295 and washers 296 are threaded onto the end of bolt 294 protruding through opening 262 to secure bolt 294. It should be noted that one skilled in the art will recognize that it is possible to affix the components of coil assembly 202 using other method such as brazing or welding the components together.

The above is one exemplary embodiment of a high temperature driver affixed to a top side of a loops in a Coriolis flowmeter. It is expected that those skilled in the art can and will design alternative high temperature drivers that infringe on the drive system as described below either literally or through the Doctrine of Equivalents.

What is claimed is:

1. A drive system for a Coriolis flowmeter capable of operating in a high temperature environment comprising:

a magnet having a first end and a second end;

a magnet keeper having a first surface and a second surface;

high temperature resistant means for attaching said second end of said magnet to said first surface of said magnet keeper wherein said high temperature resistant means for attaching includes a magnet sleeve having said second end of said magnet pressed fit into said magnet sleeve and said magnet being welded to said magnet keeper;

means for attaching said magnet keeper to flow tube means in said Coriolis flowmeter;

a coil having a first end opposing said first end of said magnet;

means for attaching said coil to said flow tube means; and circuitry for applying a current to said coil to cause said magnet and said coil to oscillate with respect to one another.

2. The drive system of claim 1 further comprising:

walls extending outward from said first surface of said magnet keeper for directing the magnetic flux of said magnet to optimize oscillation of said magnet and said coil.

3. The drive system of claim 2 wherein said high temperature environment reaches 650 degrees Fahrenheit.

4. The drive system of claim 1 wherein said drive system is composed of materials having matching coefficients of thermal expansion.

5. The drive system of claim 1 further comprising:

a coil spacer having a first surface fixedly attached to a second end of said coil and having a sufficient mass to provide a counter weight to said magnet.

6. The drive system of claim 5 wherein said means for attaching said magnet keeper to said flow tube means comprises:

a first set of mounting brackets affixed to said second surface of said magnet keeper.

7. The drive system of claim 6 wherein said means for attaching said coil to said flow tube means comprises:

a second set of mounting brackets affixed to a second surface of said coil spacer.

8. The drive system of claim 7 wherein said first mounting bracket is affixed to a top side of a first flow tube and said second mounting bracket is affixed to a top side of a second flow tube.

9. The drive system of claim 8 wherein each of said first and said second set mounting brackets comprises:

a base for attaching to said drive system;

a wing extending substantially perpendicular from said base; and a curved edge on a first end of said wing that is fixedly attached to said flow tube.

10. The drive system of claim 1 further comprising:

a magnetic pole machined to cap a first end of said magnet and held in place by magnetic attraction to said magnet.

11. A Coriolis flowmeter for measuring the mass flow rate and other properties of a material flowing through said Coriolis flowmeter comprising:

a first flow tube and a second flow tube each having a loop between an inlet and an outlet;

driver means for oscillating said flow tube having a magnet assembly and a coil assembly;

a first set of mounting brackets for affixing said magnet assembly to said first flow tube at a position on a top side of said loop substantially equidistance from said inlet and outlet wherein said first set of mounting brackets includes a flat base having a first surface affixed to said magnet assembly and a wing extending substantially perpendicularly from a second surface of said base with a curved edge on a first end of said wing for to receive said first flow tube;

a second set of mounting brackets for affixing said coil assembly to said second flow tube at a position on a top side of said loop substantially equidistance from said inlet and said outlet wherein said second set of mounting brackets includes a flat base having a first surface affixed to said coil assembly and a wing extending substantially perpendicularly from a second surface of said base with a curved edge on a first end of said wing for to receive said second flow tube; and sensor means for measuring oscillations of said flow tube means.

12. The Coriolis flowmeter of claim 11 wherein said driver means comprises:

means for applying a current to a coil in said coil assembly to cause said driver to oscillate.

13. The Coriolis flowmeter of claim 11 wherein said magnet assembly comprises:

a magnet;

a magnet keeper having a first surface affixed to a second end of said magnet and substantially enclosing said magnet to limit the magnetic field of said magnet; and means for affixing said magnet keeper to said first set of mounting brackets.

14. The Coriolis flowmeter of claim 13 wherein said magnet assembly further comprises:

a magnet sleeve having an opening and being affixed to said first surface of said magnet keeper; and a second end of said magnet pressed said magnet sleeve to hold said magnet in place in said magnet assembly.

15. The Coriolis flowmeter of claim 14 wherein said magnet assembly further comprises:

a magnet pole made of a magnetic material; and a first end of said magnet pole having a recessed cavity for receiving said second end of said magnet with magnetic attraction holding said pole on said magnet.

16. The Coriolis flowmeter of claim 11 wherein said coil assembly comprises:

a coil spacer of sufficient mass to counterbalance said magnet assembly;

a coil bobbin having said coil wound around a first end of said bobbin and a second end affixed to a first end of said coil spacer; and means for affixing said coil spacer to said said second set of mounting brackets.

17. The Coriolis flowmeter of claim 11 wherein said driver means is made of materials having substantially equal coefficient rates of thermal expansion.

18. The Coriolis flowmeter of claim 11 wherein said driver means is comprised of material that can withstand high temperature environments.

\* \* \* \* \*